United States Patent [19]

Urry

[11] 4,431,719

[45] Feb. 14, 1984

[54] LIQUID CATHODE CELL WITH CATHODE COLLECTOR HAVING RECESSES

[75] Inventor: Lewis F. Urry, Columbia Station, Ohio

[73] Assignee: Union Carbide Corporation, Danbury, Conn.

[21] Appl. No.: 413,467

[22] Filed: Aug. 31, 1982

[51] Int. Cl.³ .......................................... H01M 4/36
[52] U.S. Cl. ................................. 429/105; 429/196
[58] Field of Search ............... 429/101, 105, 196, 165

[56] References Cited

U.S. PATENT DOCUMENTS

| | | | |
|---|---|---|---|
| 3,455,739 | 7/1969 | Field | 136/6 |
| 3,527,612 | 9/1970 | Eisenberg | 136/6 |
| 3,956,014 | 5/1976 | Landsman et al. | 136/86 D |
| 3,985,573 | 10/1976 | Johnson et al. | 429/133 |
| 4,032,696 | 6/1977 | Urry | 429/101 |
| 4,154,905 | 5/1979 | Urry | 429/101 X |
| 4,154,906 | 5/1979 | Bubnick et al. | 429/94 |
| 4,355,085 | 10/1982 | Goebel | 429/101 |

OTHER PUBLICATIONS

"Electrachemical Reactions in Batteries," Ohiya Kazansa and R. A. Powers, Chem. Ed. Vol. 49, pp. 587–591, 1972.

*Primary Examiner*—Charles F. Lefevour
*Attorney, Agent, or Firm*—William E. Dickheiser

[57] ABSTRACT

The invention relates to an electrochemical cell employing a cathode collector, an anode, a separator and an electrolyte containing a liquid active reducible cathode, and wherein recesses are provided on that surface of the cathode collector which faces the anode so as to improve access of liquid cathode to electrochemically active sites on and within the cathode collector.

15 Claims, 7 Drawing Figures

LIQUID CATHODE CELL WITH CATHODE COLLECTOR HAVING RECESSES

DESCRIPTION

1. Technical Field

This invention relates to an electrochemical cell employing an anode, a cathode collector, a separator therebetween, and an electrolyte containing a liquid cathode and wherein the cathode collector has recesses on that surface of the collector which faces the anode and which recesses provide improved access for liquid cathode to reaction sites on and within the cathode collector.

2. Background Art

The continuing development of portable electrically powered devices creates a continuing demand for the development of reliable, long service life cells or batteries for their operation. Recently developed electrochemical cell systems that will provide a long service life utilize highly reactive anode materials such as lithium, sodium, and the like, in conjunction with high energy density liquid cathode materials and nonaqueous electrolytes.

However, these high-energy producing materials are not well-suited for incorporation into cylindrical cells in a conventional manner. Additional considerations arise with the use of such reactive materials. For example, since the anode materials dissolve during discharge, thereby decreasing the volume of the anode and increasing the distance between anode, separator and cathode collector, the length of the electrolyte path therebetween will increase and consequently the internal resistance of the cell will increase.

Applicant's prior patent, U.S. Pat. No. 4,032,696, which is incorporated herein by reference, discloses a cylindrical cell which employs a cylindrical cathode collector disposed interior of the cell container and encompassing a separator and an anode. A liquid cathode is used in the cell system. The anode comprises at least two discrete bodies having centrally disposed biasing means for continuously exerting an outward force against the anode bodies so as to provide good physical contact between the anode and separator interface and the separator and cathode collector interface.

Another problem with these highly reactive cell systems is the formation of a solid reaction product during the discharge of most soluble cathode materials. Generally reaction products accumulate at reaction sites throughout the cathode collector, favoring reaction sites closest to the anode. On low-drain cell discharge a small gradient occurs wherein solid reaction products are deposited slowly throughout the cathode collector but tend to show a preference for that part of the cathode collector which is near an anode.

Blockage of active reaction sites in low-drain cell discharge generally does not significantly interfere with the performance of the cell and the cause of cell failure is usually exhaustion of the metal anode or liquid cathode.

On high-drain cell discharge a large gradient of reaction products occurs, a significant amount of reaction products being deposited on active sites on or near that surface of the cathode collector nearest an anode. If reaction products form on or near the surface of the cathode collector and are sufficiently impervious so as to block adequate liquid movement to reaction sites within the collector, then additional liquid cathode not already in the collector may be excluded from reaching active reaction sites and the cell may fail. This may occur even though there is still adequate ion flow. This blockage of liquid cathode from active reaction sites is especially detrimental since most liquid cathode cells can accommodate more cathode material than can be held in the pores of the collector and so additional cathode material is usually stored external of the cathode collector in a liquid cathode reservoir. During discharge, this reserve liquid must migrate to a reaction site on or in the cathode collector. In the cylindrical cell design as taught by applicant in U.S. Pat. No. 4,023,696, the reservoir is located centrally in the cell, posterior to the anode segments. The reserve liquid cathode must therefore travel through the solid barrier being formed on the porous cathode collector in order to reach other active sites in the collector.

It would be a significant contribution to the development of high-energy cells to provide a means for reducing the reaction product barrier that forms on and in a cathode collector during high-drain periods, which barrier hinders the movement of liquid cathode materials into the collector.

Therefore, it is an object of this invention to provide an electrochemical cell employing an anode, a cathode collector, a separator therebetween and an electrolyte containing a liquid cathode, and wherein the cathode collector has recesses on that surface of the collector which faces the anode and which recesses provide improved access to reaction sites within the cathode collector for liquid cathode.

The foregoing and additional objects of this invention will become more fully apparent from the following description and accompanying drawings and examples.

Disclosure of the Invention

The invention relates to an electrochemical cell comprising a housing having a container and a cover, an anode disposed within the container, a cathode collector, a separator disposed between the anode and the cathode collector and an electrolyte containing a liquid active reducible cathode disposed within said container; the improvement being a cathode collector having recesses on that surface of the cathode collector which faces the anode so as to permit liquid cathode to have improved access to reaction sites on and within the cathode collector.

Numerous cell shapes and internal component configurations can be envisioned all of which are in keeping with this invention when recesses are provided on that surface of the cathode collector which faces the anode.

In one preferred embodiment, the invention relates to an electrochemical cell comprising an electrically conductive container having an upright sidewall, a closed end and an open end; a cathode collector disposed within and in surface contact with the container so as to adapt the container as the first terminal of the cell and having recesses on that surface of the collector which faces away from the container; a separator disposed within and in surface contact with the cathode collector; an anode disposed within the separator; means for effectively maintaining physical and ionic contact between the anode, separator and cathode collector interfaces during discharge of the cell; an electrolyte containing a soluble active reducible cathode disposed within and in contact with the cathode collector and anode; a cover for the container; an insulating member interposed between the cover and the top inner wall of the container such that a seal is formed between the cover and the container; and the anode and the cover being electrically interconnected so as to adapt the cover as the second terminal of the cell.

If desired, the cell's container could have a plastic sidewall with metal bottom and top closures and an inner metal liner, the metal liner being employed to provide contact with the cathode collector and the bottom metal closure.

An electronically insulating separator could be disposed between the inner wall of the container or the metal liner within the container and the cathode collector whereupon the cathode collector could then be electronically connected to the cover of the cell while the centrally disposed anode could be electronically connected to the container or the metal liner within the container thereby adapting it as the negative terminal of the cell.

Additionally if desired or found preferable for certain cell systems, an anode may be disposed adjacent or nearby the container sidewall and encompassing a centrally disposed cathode collector whereupon the outward-facing surface of the cathode collector would be adapted with recesses so as to provide the necessary access of liquid cathode to reaction sites on and within the cathode collector.

Cells may be cylindrical, rectangular or square. The cell components may also be rectangular as, for example, in a cell wherein a flat cathode collector is disposed between two layers of anode material. In such an embodiment both surfaces of the cathode collector may have recesses thereon.

As used therein and as described in an article titled "Electrochemical Reactions in Batteries" by Akiya Kozawa and R. A. Powers in the Journal of Chemical Education—Vol. 49, pages 587 to 591, September 1972 issue, a cathode is a reactant material that is electrochemically reduced on discharge of a cell. A cathode collector is not an active reducible or oxidizable material and functions as a current collector for the cathode of a cell.

The term liquid cathode as used herein refers to an active cathodic reducible material which exists in a liquid state either due to being a liquid material itself or due to being in solution in an electrolyte system.

In a cell employing a liquid cathode and a cathode collector, the cathode collector in addition to functioning as the current collector must also serve as extended area reaction sites for the cathodic electrochemical process of the cell. Thus the cathode collector should have porosity with preferably at least 50% interconnected voids for providing increased access to reaction sites and be of a material capable of catalyzing or sustaining the cathodic electrochemical process. If the porosity of the cathode collector is increased too much then the cathode collector may become very fragile and susceptible to breakage when handled. Cathode collectors with porosity of up to 80% interconnected voids exhibit build-up of solid reaction products during periods of high-drain cell discharge which may block liquid cathode access to active reaction sites.

Materials suitable for being formed into a cathode collector are carbon materials and metals such as nickel, with acetylene black being preferable. In addition to the above characteristics, the cathode collector when made of a particulate material should be capable of being molded directly within a container or capable of being molded into various size discrete bodies that can be handled without cracking or breaking. To impart a cohesive characteristic to some types of cathode collector materials, such as carbonaceous materials, a suitable binder material with or without plasticizers and with or without stabilizers, can be incorporated into the cathode collector. Suitable binder materials for this purpose may include vinyl polymers, polyethylene, polypropylene, acrylic polymers, polystyrene, polytetrafluoroethylene, rubber elastomers and the like. For example, polytetrafluoroethylene would be the preferred binder for cathode collectors for use with liquid oxyhalide cathodes. The binder, if required, should be added in an amount of from between about 5% and about 30% by weight of the molded cathode collector since an amount less than 5% would not provide sufficient strength to the molded body while an amount larger than 30% would wet-proof the surface of the carbon and/or reduce the available surface of the carbon, thereby reducing the active site areas available for the cathodic electrochemical process of the cell. Preferably, the binder should be between 10% and 25% by weight of the cathode collector. Of importance in selecting the materials for the cathode collector is to select materials that will be chemically stable in the cell system in which they are to be used.

In accordance with the subject invention recesses such as grooves, slots or holes are formed in that surface of the cathode collector which faces the anode.

The recesses extend the life of a cell on high-drain discharge since they prevent the formation of a blocking accumulation of reaction product on and in the cathode collector surface opposite the anode by providing bypasses for the liquid active cathode material. The grooves, slots, holes or other recesses in the cathode collector provide access for liquid cathode material from a reservoir or other site external from the cathode collector to reach active sites on or within the collector.

The recesses may be longitudinal, horizontal or diagonal; continuous or interrupted; or may be full or partial bores through the wall of the cathode collector. For ease of formation, the cathode collector may be extruded having longitudinal or horizontal recesses on that surface of the cathode collector which faces the anode. In the case of a cylindrical cell, longitudinal slots or grooves extending to the bottom of the cell have the additional advantage of facilitating the displacement of gases during filling of the cell with the liquid electrolyte and cathode, thereby permitting faster filling.

When designing a cell in accordance with the invention, the interfacial surface area between the cathode collector and the anode and the distance across this interface must be considered, as these factors affect the voltage on load of the cell. When the interfacial surface area is small the location of the active reaction sites on discharge will quickly move into the cathode collector as the production of reaction products builds up on the cathode collector and blocks the reactive sites on the cathode collector surface. Replacement liquid cathode from a reservoir must traverse the inactive portion of the cathode collector to reach reactive sites. When this distance between the anode and the reactive sites of the cathode collector is large the internal resistance of the cell will also be large and produce a corresponding drop in cell voltage.

Both the interfacial contact surface area and the internal resistance of the cell are interrelated and affected by the inclusion of recesses in the cathode collector. Because the distance across the interface between the cathode collector and the anode is significantly greater at a point where a recess exists in the cathode collector, the resistance at such a point is large and so less current is passed at that point. Thus, while a recess increases the total surface area of that cathode collector surface which opposes the anode, it reduces the overall surface area which is in close proximity to the anode and which meets little internal resistance to current flow. However, by not forming as quickly in the cathode collector recesses, reaction products do not exist in the recesses in a sufficient accumulation to block the feeding of liquid cathode into the cathode collector. Hence the proper choice of shape and number of cathode collector recesses for a particular cell size and discharge rate may extend the flow of liquid cathode to and into the current collector and the overall life of the cell will be increased without detrimentally affecting the cell voltage. Generally the projected facial area of the recesses in the cathode collector comprise from about five to about forty percent of the surface area of the collector which faces the anode, and preferably from about five to about fifteen percent of the surface area of the collector which faces the anode.

The optimum number and shape of the recesses in the cathode collector may be expected to vary with cell size and cell system.

When the cathode collector of a cylindrical cell is disposed outwardly from the anode, the collector may comprise a cylinder having recesses on its radially inwardly facing surface or may comprise semi-cylindrical members having recesses on the radially inwardly facing surfaces of the members. Liquid cathode reservoirs may be provided within a centrally disposed anode or as recesses on the surface of the cathode collector that faces the wall of the container. Alternatively, an axially disposed cathode collector may be provided which has recesses on its radially outwardly facing surface, which surface faces a cylindrically encompassing separator liner and an anode, or may provide several axially disposed collector members encompassed by a separator liner and an anode, which members have recesses on their radially outwardly facing surfaces. A central axially positioned reservoir may extend through the cathode collector.

A cathode collector of a flat cell may be disposed between two anode layers and incorporate recesses on both surfaces which face an anode, or may be disposed opposite one anode and have recesses on only that surface which faces the anode. A flat cell may also comprise an anode layer disposed between two cathode collectors, each cathode collector having recesses on that surface of the collector which faces the anode.

The anode materials suitable for use with this invention can be active metals such as alkali and alkaline earth metals and aluminum. Examples of suitable anodes for use in nonaqueous cells would include lithium, sodium, calcium, magnesium, lithium monoaluminide and lithium-magnesium alloy.

A biasing means, which will exert a resilient bias against the anode or cathode collector when assembled into a cell so as to provide continuous physical contact between the anode, separator and cathode collector thereby maintaining a low internal cell resistance during discharge, could be any spring means as disclosed in U.S. Pat. Nos. 4,154,906 and 4,032,696.

Liquid active reducible cathode materials usually are mixed with a conductive solute which is a non-reactive material and which is added to improve conductivity of the liquid active reducible cathode materials, or the liquid cathode materials can be mixed with both a conductive solute and an electrochemically reactive or non-reactive cosolvent material. When an electrolyte solvent performs the dual function of acting as solvent for an electrolyte salt and as the active cathode material of the cell, then the solution is referred to as a "cathode-electrolyte". In assembling the cell, a liquid cathode could be placed into a cavity where it would permeate through the anode, the separator and the cathode collector of the cell. Alternatively or in addition, the separator could be soaked with the liquid cathode prior to being assembled in the cell or after it is assembled in the cell.

Suitable nonaqueous liquid cathode materials for use in this invention could be one or more of the liquid oxyhalides of an element of Group V or Group VI of the Periodic Table and/or one or more of the halides of an element of Group IV to Group VI of the Periodic Table, said Periodic Table being the Periodic Table of Elements as set forth in the inside back cover of the Handbook of Chemistry and Physics, 62nd Edition, The Chemical Rubber Co., Cleveland, Ohio, 1981–1982. For example, such non-aqueous cathode materials would include sulfuryl chloride, thionyl chloride, phosphorus oxychloride, thionyl bromide, chromyl chloride, vanadyl tribromide, selenium oxychloride, sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dischloride and tin tribromide chloride. Another suitable cathode material would be liquid sulfur dioxide.

Some preferred combinations of nonaqueous cathode materials and anodes would be as follows:
(1) sulfuryl chloride/Li or Na;
(2) thionyl chloride/Li or Na;
(3) phosphorus oxychloride/Li or Na;
(4) sulfur monochloride/Li or Na;
(5) sulfur monobromide/Li or Na;
(6) selenium tetrafluoride/Li or Na.

Some preferred combinations of soluble aqueous cathode materials and anodes would be a zinc, magnesium or aluminum anode in an aqueous solution of persulfate or chromic acid.

A solute for use in this invention may be a simple or double salt which will produce an ionically conductive solution when dissolved in a suitable solvent. Preferred solutes for nonaqueous systems are complexes of inorganic or organic Lewis acids and inorganic ionizable salts. The only requirements for utility are that the salt, whether simple or complex, be compatible with the solvent and other materials being employed and that it yield a solution which is ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol 226, July/December, 1938, pages 293–313 by G. N. Lewis).

A suggested reaction mechanism for the manner in which these complexes function in a solvent is discribed in detail in U.S. Pat. No. 3,542,602 wherein it is suggested that the complex or double salt formed between the Lewis acid and the ionizable salt yield and entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride, and potassium bromide.

It will be obvious to those skilled in the art that the double salts formed by a Lewis acid and an ionizable salt may be used as such or the individual components may be added to the solvent separately to form the salt or the resulting ions in situ. One such double salt, for example, is that formed by the combination of aluminum chloride and lithium chloride to yield lithium aluminum tetrachloride.

If desired, a cosolvent may be added to the liquid active reducible cathode and solute solution to alter the dielectric constant, viscosity or solvent properties of the solution to achieve better conductivity. Some examples of suitable cosolvents are nitrobenzene, tetrahydrofuran, 1,3-dioxolane, 3-methyl-2-oxazolidone, propylene carbonate, γ-butyrolactone, sulfolane, ethylene glycol sulfite, dimethyl sulfite, dimethyl sulfoxide, benzoyl chloride, dimethoxyethane, dimethyl isoxazole, diethyl carbonate, acetonitrile, liquid sulfur dioxide and the like.

The separator for use in this invention can be made from a wide variety of materials, such as glass, plastics, cellulose, starch, etc. It can be in the form of swellable coatings on paper, films such as cellulose, woven or felted papers, perforated sheets or combinations of the foregoing.

The separator has to be chemically inert and insoluble in the cell system and should have a porosity of about 25 percent or more, preferably about 50 percent, so as to permit the liquid electrolyte to permeate through and contact the anode, thus establishing an ion transfer path between the anode and cathode. Suitable separators for use with liquid oxyhalide cathodes are the non-woven glass separators.

The container and cover for use in this invention can be stainless steel, iron, nickel, nickel-plated steel, plastic or some other material that will not corrode or otherwise deteriorate when in contact with the cell materials. Preferably in the case of the liquid oxyhalide cathode system, the container and cover could be made of nickel or of stainless steel.

The insulating member disposed between the cover and the can has to be stable in the presence of the cell components and can be selected from such materials as polytetrafluoroethylene, fluorinated ethylene-propylene copolymer, ethylene copolymer with fluorinated ethylene-propylene, polychlorotrifluoroethylene, perfluoro-alkoxy polymer, polyvinyl, polyethylene and polystyrene.

BRIEF DESCRIPTION OF THE DRAWINGS

The present invention will become more apparent from the following description thereof when considered together with the accompanying drawings which are set forth as being exemplary of embodiments of the present invention and are not intended, in any way, to be limitative thereof and wherein.

DETAILED DESCRIPTION OF THE DRAWINGS

Figure 1:
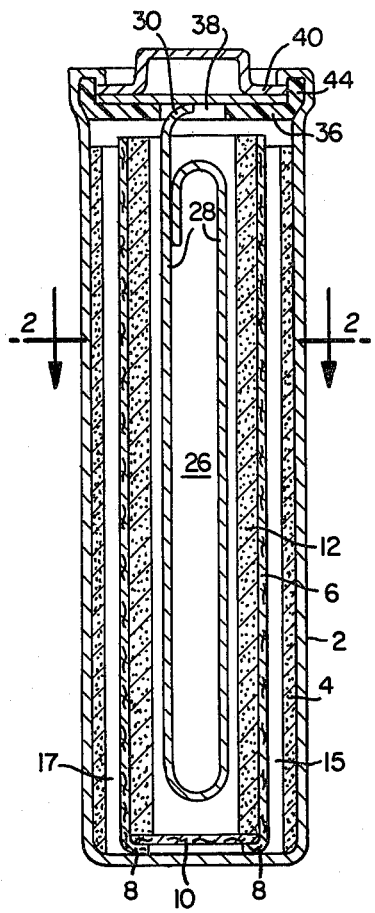
FIG. 1 is a vertical cross-sectional view of a fully assembled electrochemical cell made in accordance with this invention.
Figure 2:
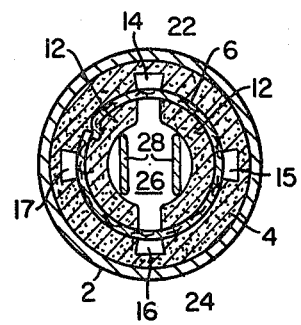
FIG. 2 is a sectional view taken along line 2—2 of FIG. 1.

Referring in detail to FIGS. 1 and 2 there is shown a cross-sectional view of a cylindrical cell comprising a cylindrical container 2 having disposed therein a cathode collector 4 in contact with the inner upstanding circumference of the container 2 thereby adapting the container as the cathodic or positive terminal for the cell. FIG. 2 shows that longitudinal slots, 14, 15, 16 and 17, in accordance with this invention, extend from the radially inward-facing surface of the cathode collector 4 radially outwardly into the collector along the length of the collector. The slots as shown in FIG. 2 are spaced at 90° intervals. Slots 15 and 17 are shown in FIG. 1. To increase access of liquid cathode to reaction sites in the cathode collector 4 without increasing internal resistance, which increases if the interfacial contact area between the cathode collector and the anode is reduced, each slot is narrow on the surface of the cathode collector and widens as the slot extends into the collector. If desired, the cathode collector material could be extruded within the container 2, rolled with the container material or be composed of one or more segments to form a cylindrical tube and then placed in the can.

Disposed within and in contact with the inner circumference of cathode collector 4 is a separator liner 6 with its bottom end 8 radially folded inward and supporting a bottom separator or disc 10.

A two-member anode 12 is continuously biased against the separator liner 6 by an electrically conductive spring strip 28 which is appropriately bent into a flattened elliptically shaped member having an extended end 30.

A reservoir 26 is located between the anode members and contains additional liquid cathode for use during cell operation. Two of the slots 14 and 16 in the cathode collector are shown abutting the reservoir 26, separated only by the separator liner 6. By this arrangement interfacial contact area is minimally reduced.

The extended end 30 of spring strip 28 is shown projected above the surface of the anode 12. An insulator disc 36 has a central opening 38 through which the projected end 30 of the spring strip 28 passes, whereupon the end 30 is then welded to a cover thereby adapting the cover 40 as the anodic or negative terminal of the cell. Before closing the cell, the electrolyte solution containing liquid cathode can be dispensed into reservoir 26 whereupon it can permeate through the anode, separator and cathode collector of the cell. In addition, the separator could be presoaked with liquid cathode and electrolyte prior to being inserted into the cell.

The insulating disc 36 has an upright sidewall 44 disposed between the cover 40 and the upper inner wall of container 2 for sealing the cell through conventional crimping techniques.

Figure 3:
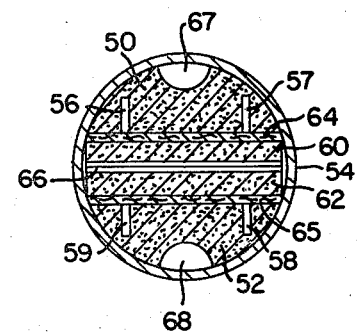
FIG. 3 is a horizontal cross-sectional view of another embodiment of a cell made in accordance with this invention.

Another embodiment of a cathode collector in accordance with this invention is shown in a horizontal cross-section of a cell in FIG. 3. Specifically, the cathode collector comprises two semi-cylindrical members 50 and 52 disposed in a cylindrical container 54. The semi-cylindrical cathode collectors 50 and 52 each have two longitudinal recesses, 56 and 57 and 58 and 59, respectively, in the form of narrow slots on the collector surfaces which face the cell anodes 60 and 62, respectively. The interfacial contact surface areas between cathode collector 50 and anode 60 and cathode collector 52 and anode 62 are minimally reduced and the exposed reaction sites in cathode collectors 50 and 52 are significantly increased by the design of the recesses 56, 57, 58 and 59. Each recess forms a narrow gap across the cathode collector/anode interfaces which slightly reduces the contact surface area, and then each slot extends into its respective cathode collector to provide access of active sites for electrochemical reactions to liquid cathode.

Separator linears 64 and 65 separate cathode collectors 50 and 52 from corresponding anodes 60 and 62. The anodes 60 and 62 are resiliently biased against the separator liners 64 and 65 by a folded compressed spring member 66 that is disposed between the two anodes.

Cathode collectors 50 and 52 are shown with each having a longitudinal semicircular reservoir 67 and 68 respectively, located on the curved outer surfaces of the collector members which surfaces face the internal wall of the container 54.

Figure 4:
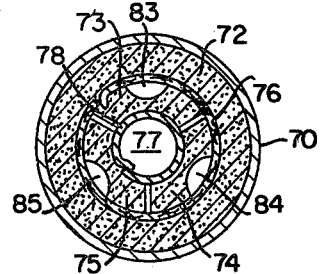
FIG. 4 is a horizontal cross-sectional view of still another embodiment of a cell made in accordance with this invention.

Still another embodiment of a cathode collector is shown in FIG. 4. Shown in horizontal cross-section is a cell having a container sidewall 70, a cylindrical anode body 72, a three-member cathode collector comprising three arcuate members 73, 74 and 75 and a separator liner 76 disposed between the anode 72 and the cathode collector members 73, 74 and 75. The three cathode collector members each have an arc measurement of about 120°. A longitudinal groove 83, 84 and 85, in each member respectively forms three recesses in the cathode collector in keeping with the invention.

When the cathode collector members 73, 74 and 75 are arranged in an opposing fashion as shown in FIG. 4, an axial reservoir 77 is defined centrally behind the members. As shown in FIG. 4, the three member collector is inserted into a container with a coiled spring member 78 disposed in the axial reservoir 77, the coiled spring member 78 resiliently biasing the collector arcuate members against the separator liner 76 of the cell which in turn contacts the anode 72 thereby maintaining good physical contact between these components and low internal cell resistance.

Figure 5:
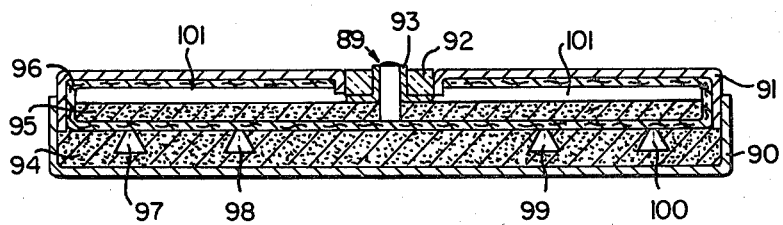
FIG. 5 is a vertical cross-sectional view of still another embodiment of a cell made in accordance with this invention.

FIG. 5 is a vertical cross-sectional view of a flat cell in accordance with this invention. The cell comprises a metal container 90 and cover 91 housing an anode 95, a separator 96, a cathode collector 94, an electrolyte containing soluble active cathode and a reservoir 101 for liquid storage. The container 90 and cover 91 are welded or otherwise hermetically sealed and comprise the positive terminal of the cell. There is a central aperture 89 through the cover 91. The separator liner 96 completely encompasses the anode 95 and reservoir 101 and electronically insulates the anode 95 from the container 90 and cover 91. A hollow pin 93 extends through the central aperture 89 and is in electronic contact with the anode 95. An electronically insulating glass seal 92 is disposed around the pin 93 and seals the aperture 89. Electrolyte containing an active cathodic reducible material is dispensed through the pin 93 during assembly. The pin 93 is then hermetically sealed and is the negative terminal of the cell. Excess electrolyte containing liquid cathode which is not absorbed by the separator liner 96 and cathode collector 94 fills reservoir 101 and migrates to the cathode collector 94 as the cell is discharged.

The cathode collector 94, in keeping with this invention, has recesses 97, 98, 99 and 100 on that surface which faces the anode. The recesses are horizontal slots, shown in cross section in FIG. 5. Each recess is narrow on the cathode collector surface so as to reduce the interfacial surface area between the cathode collector 94 and the anode 95 by a minimum amount. Improved access to reaction sites within the cathode collector 94 are insured by widening the slots 97, 98, 99 and 100 as they extend into the collector.

EXAMPLE I

Cylindrical cells having thionyl chloride liquid cathode in a 1.5 M LiAlCl$_4$ in thionyl chloride electrolyte and a solid lithium anode were manufactured in accordance with this invention. The 0.475 inch (1.21 cm) diameter and 1.64 inch (4.17 cm) long cells employed a cylindrical cathode collector of polytetrafluoroethylene-bonded acetylene black having an outer diameter of about 0.450 inch (1.14 cm), an inner diameter of about 0.320 inch (0.81 cm) and eight longitudinal recesses, each in the form of a slot about 0.035 inch (0.09 cm) wide along the inwardly-facing surface of the cathode collector, about 0.025 inch (0.06 cm) deep and about 0.050 inch (0.13 cm) wide at the base of the slot. Each of the eight slots removed 4.6% of the interfacial surface area between the cathode collector and the anode that would otherwise be in close proximity so that the interfacial contact area was reduced by about 37% compared to control cells which had no slots.

Figure 6:
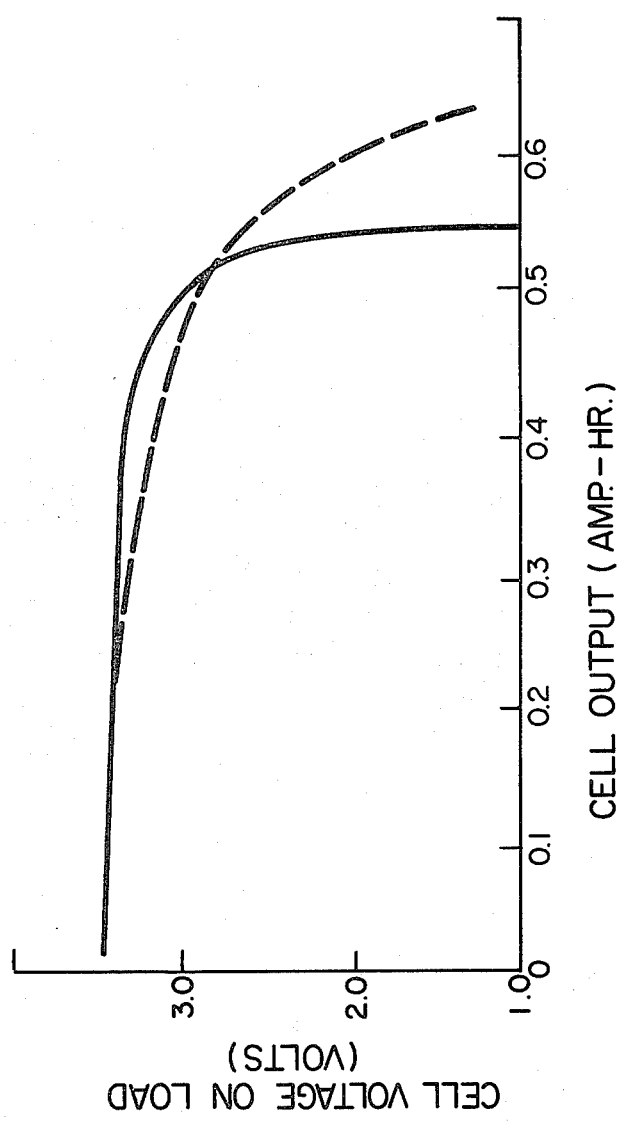
FIGS. 6 and 7 are graphs showing cell voltage vs. cell output.

Cells with eight slots and control cells with no slots were run on a 35-ohm continuous drain which results are shown in FIG. 6. The output of the control cell is shown as a solid line and the output of the cell having eight recesses in the cathode collector surface which faces the anode is shown as a dashed line. As can be seen from the Figure, the control cell with the unslotted cathode collector exhibited a sudden voltage drop-off, indicating block-off of liquid cathode from the cathode collector's reaction sites after yielding only 85% of the theoretical ampere-hour capacity of the cell. The cell having the cathode collector with eight slots did not show a sudden voltage drop-off but did fall off gradually indicating a build up in internal resistance. Because the slotted cathode collector fell off in voltage earlier due to internal resistance, this particular embodiment having about a 37% reduction in surface area is not considered preferred but does show that the mode of failure was not due to cathode blocking.

EXAMPLE II

Cylindrical cells as described in Example I were manufactured except that the cells having recesses in the cathode collector had only two longitudinal slots on the inward facing surface of the cylindrical cathode collector. The two slots collectively reduced the interfacial contact surface area between the cathode collector and the anode by about 10 percent.

Figure 7:
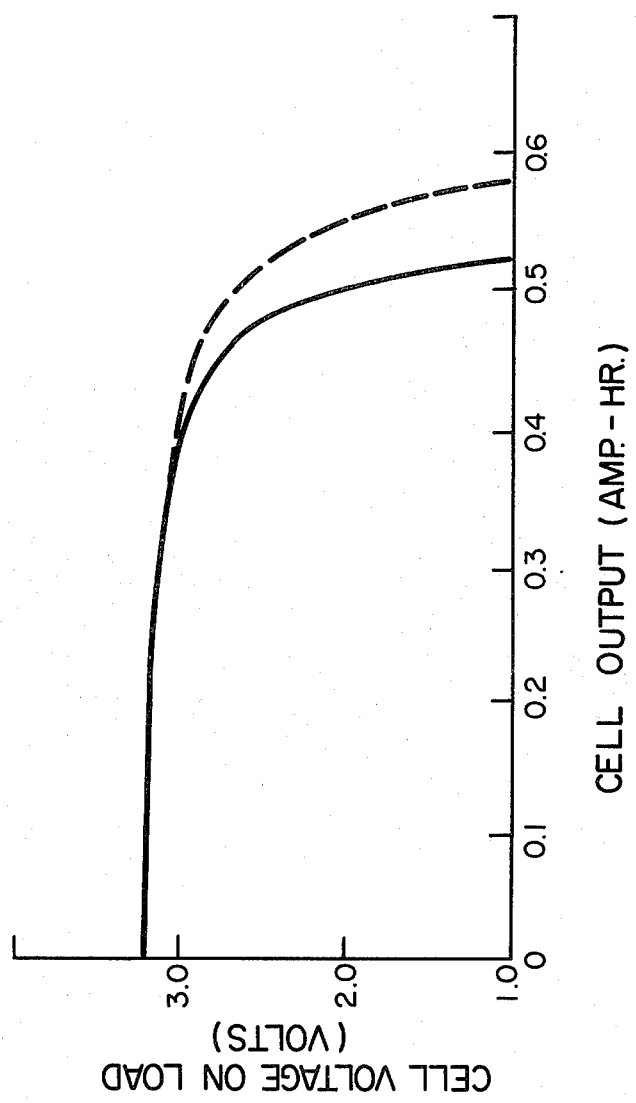

The two-slotted cells and control cells were discharged on a 25-ohm continuous drain. The discharge curves are shown in FIG. 7. The output of the control cell is shown as a solid line. The output of the cell having two slots in the cathode collector to improve the access of liquid cathode to active reaction sites in the cathode collector is shown as a dashed line. As is shown in FIG. 7, the cell having two slots in the cathode collector discharged effectively identically with the control cell having no recesses in its cathode collector for a substantial portion of the discharge. The control cell then showed the sudden voltage drop which is characteristic of liquid cathode blockage from the collector due to reaction product buildup. The two-slot collector cells continued to perform and then too failed due to cathode collector blockage but not before yielding about 92 percent of the theoretical ampere-hour capacity of the cell.

It is to be understood that modifications and changes to the preferred embodiment of the invention herein described and shown can be made without departing from the spirit and scope of the invention.

I claim:

1. An electrochemical cell comprising a housing having a container and a cover, an anode disposed within said container, a cathode collector, a porous separator disposed between said anode and said cathode collector and an electrolyte containing a liquid active reducible cathode and a conductive solute disposed within said container; the improvement being a cathode collector having recesses on that surface of the cathode collector which faces the anode so as to permit liquid cathode to have improved access to reaction sites on and within said cathode collector.

2. The electrochemical cell in accordance with claim 1 wherein said cathode collector comprises a carbonaceous material and a binder in an amount of between about 5% and 30% by weight of the collector, said binder selected from the group consisting of vinyl polymers, polyethylene, polypropylene, acrylic polymers, polystyrene, polytetrafluoroethylene and rubber elastomers.

3. The electrochemical cell in accordance with claim 1 wherein said cathode collector comprises acetylene black and polytetrafluoroethylene.

4. The electrochemical cell in accordance with claim 1 wherein said cathode collector is cylindrical and encompasses said separator and said anode of said cell.

5. The electrochemical cell in accordance with claim 4 wherein said recesses in said cathode collector comprise longitudinal slots.

6. The electrochemical cell in accordance with claim 1 or 5 wherein the recesses of said cathode collector have a projected facial area comprised from about five percent to about forty percent of the surface area of said cathode collector which surface area faces the anode of said cell.

7. The electrochemical cell in accordance with claims 1 or 5 wherein the recesses of said cathode collector have a projected facial area comprised from about five percent to about fifteen percent of the surface area of said cathode collector which surface area faces the anode of said cell.

8. The electrochemical cell of claim 1 wherein the electrolyte contains at least one oxyhalide of an element of Group V or Group VI of the Periodic Table.

9. The electrochemical cell of claim 1 wherein the electrolyte contains at least one halide of an element of Group IV to Group VI of the Periodic Table.

10. The electrochemical cell of claim 1 wherein the anode is lithium and the active reducible cathode is sulfuryl chloride.

11. The electrochemical cell of claim 1 wherein the anode is lithium and the active reducible cathode is thionyl chloride.

12. The electrochemical cell of claim 1 wherein the anode is lithium and the active reducible cathode is phosphorus oxychloride.

13. The electrochemical cell of claim 1 wherein the anode is lithium and the active reducible cathode is sulfur monochloride.

14. The electrochemical cell of claim 1 wherein the anode is lithium and the active reducible cathode is sulfur monobromide.

15. The electrochemical cell of claim 1 wherein the anode is lithium and the active reducible cathode is selenium tetrafluoride.

* * * * *